United States Patent [19]

Gringer

[11] Patent Number: 5,056,952
[45] Date of Patent: Oct. 15, 1991

[54] ROTATIONALLY ADJUSTABLE TOOL HOLDER

[75] Inventor: Donald Gringer, New York, N.Y.

[73] Assignee: Allway Tools, Inc., Bronx, N.Y.

[21] Appl. No.: 451,205

[22] Filed: Dec. 15, 1989

[51] Int. Cl.⁵ ............................................. F16C 11/00
[52] U.S. Cl. ....................................... 403/96; 403/88; 403/93; 403/103; 403/DIG. 9
[58] Field of Search ................. 403/83, 84, 88, 91–93, 403/96, 103–104, 235, 237, 238, 256, DIG. 9; 248/278, 291; 81/129, 177.8, 177.9, 175

[56] References Cited

U.S. PATENT DOCUMENTS

| | | | |
|---|---|---|---|
| 1,256,565 | 2/1918 | Inghram | 403/103 X |
| 1,500,132 | 7/1924 | Hummelgard | 403/96 X |
| 1,537,649 | 5/1925 | McGlashan et al. | 403/96 X |
| 1,609,396 | 12/1926 | Blonigen | 248/291 |
| 1,649,951 | 11/1927 | English | 403/96 |
| 2,486,583 | 11/1949 | Waklet | 403/103 X |
| 2,488,305 | 11/1949 | Manger et al. | 403/103 X |
| 2,608,894 | 9/1952 | Miller et al. | 403/103 X |
| 2,759,620 | 8/1956 | Pharris | 248/291 |
| 3,489,157 | 1/1970 | Pearlstine | 403/103 X |
| 3,583,734 | 6/1971 | Magi | 403/103 X |
| 3,734,439 | 5/1973 | Wintz | 248/291 X |

FOREIGN PATENT DOCUMENTS 1012666 12/1965 United Kingdom ................ 248/291
1075403 7/1967 United Kingdom ................ 248/291

Primary Examiner—Peter M. Cuomo
Assistant Examiner—Franco S. DeLiguori
Attorney, Agent, or Firm—Bryan, Cave, McPheeters & McRoberts

[57] ABSTRACT

An adjustable tool holder for carrying a tool, such as a paint brush, on a handle, such as an extension handle. The invention broadly includes a yoke assembly for mounting the holder on the handle and a carrier assembly for carrying the tool. The yoke assembly has a generally U-shaped configuration, with yoke arms extending upward from a handle mount. The carrier assembly includes a link assembly for mounting the carrier assembly on the yoke for angular movement in discrete preselected steps about an axis passing through the yoke, operable by imposing a moment force on the link assembly. Link arms extend between and in sliding contact with the inner surfaces of the yoke arms, with axle plugs joining adjacent yoke and link arms for rotational movement. A series of detent recesses and projections, respectively formed in adjacent yoke and link arms, permits rotational movement in a series of discrete steps of selected angular distance, without requiring the loosening of any screws or wing nuts. A clamp assembly accepts and retains a selected portion of the tool therein.

9 Claims, 3 Drawing Sheets

ROTATIONALLY ADJUSTABLE TOOL HOLDER

BACKGROUND OF THE INVENTION

The present invention is directed to the field of hand tools, and more particularly to the field of tool holding accessories designed to allow the use of tools mounted on extension devices.

Persons using hand tools are often called upon to perform operations in elevated, restricted or otherwise difficult-to-reach locations. This is particularly true of painters, who must deal with ceilings and high walls on a daily basis. The art has evolved a solution for the use of roller applicators in such situations, through the use of extension handles, threaded to attach directly to a roller. Several such handles can be assembled to allow the painter to stand on the floor while painting an entire ceiling.

No real solution has been found, however, that allows the use of a paint brush in such locations. Not only must the edges of a ceiling be painted by a brush, but some ceiling surfaces, such as pressed tin or high-relief textured surfaces, are completely unsuitable for roller application. The devices available for attaching a brush to an extension handle generally include several separate pieces, with angular adjustment provided by a wing nut. Such devices are difficult to use and present the very real probability of separation during adjustment, often resulting in lost parts at very inconvenient moments. In practice, there exists no viable alternative to performing such work on a ladder, with inherent fatigue from working in awkward positions and additional danger from falls.

The present invention addresses this lack of development by introducing a device that combines ease of use with security of construction, giving the painter the same freedom for brush painting that he has enjoyed for roller painting.

SUMMARY OF THE INVENTION

An object of the present invention is to provide a tool holder capable of retaining a tool, particularly a paint brush, on an extension handle at a selected angle.

A further object of the invention is to provide a tool holder that allows a user to alter the angle at which the tool is held, without loosening screws, nuts or the like.

These and other objects are achieved by the present invention of an adjustable tool holder for carrying a tool on a handle. The invention broadly includes a yoke means for mounting the holder on the handle and carrier means for carrying the tool. The carrier means includes link means for mounting the carrier means on the yoke for angular movement in discrete preselected steps about an axis passing through the yoke, operable by imposing a moment force on the link means, and clamp means for accepting and retaining a selected portion of the tool therein.

A preferred embodiment of the invention includes a yoke assembly, made up of a handle mount, having a bore threaded to accept the handle, and two parallel spaced yoke arms. Each yoke arm extends longitudinally from the handle mount, and each has a link mounting aperture formed therein. The link mounting apertures jointly define a transverse link rotating axis. Inner yoke arm surfaces are mutually opposed, each having a plurality of yoke detent recesses formed therein, in circular opposed arrays around the periphery of each link mounting aperture at a selected detent radius distance from the transverse link rotating axis. A carrier assembly includes two parallel link arms, dimensioned to fit within the yoke arms and having link arm surfaces in sliding contact with respective inner yoke arm surfaces. Each link arm has a yoke mounting aperture formed therein, positioned on the transverse link rotating axis for rotational movement thereon. Each outer link arm surface has a plurality of link detent means formed therein, in circular opposed arrays around the periphery of each the yoke mounting aperture at the selected detent radius distance from the transverse link rotating axis. In a preferred embodiment, these link detent means are surface projections, dimensioned for acceptance by the yoke detent recesses. The array of detent means on each link arm is capable of being moved into registration with the array of yoke detent recesses on the adjacent yoke arm. In an alternative embodiment the link detent means includes link detent recesses with a detent plunger carried in each link plunger recess, spring mounted for axial movement between a normally extended position wherein a distal end of the plunger extends into a yoke detent recess, and a compressed retracted position wherein the distal end of the plunger does not extend into a yoke detent recess. In either embodiment, at selected relative rotational positions of the carrier assembly with respect to the yoke assembly, the detent means engage the yoke detent recesses to retain the carrier assembly at a selected rotational position. Further, the application of rotational force to the carrier assembly causes the detent means to disengage from the recesses, permitting rotational movement of the carrier assembly. Also, a part of the carrier assembly is a holder, having a wall defining a hollow holder well dimensioned to accept a selected portion of the tool therein. A portion of the wall transversely extends between and is integral with the link arms at a location spaced from the transverse link rotating axis by a distance greater than the selected detent radius distance. The wall portion has a threaded retaining aperture formed therein. A retaining screw is threaded in the retaining aperture, the distal end of the screw extending into the holder well to exert a retaining force on the selected tool portion. Finally, two axle plugs are carried in and extend between the link mounting apertures and the yoke mounting apertures.

BRIEF DESCRIPTION OF THE DRAWINGS

FIGS. 6(a) and (b) are detail sectional views, taken on plane V—V of FIG. 2, showing an alternative embodiment of the invention in two stages of rotation.

DETAILED DESCRIPTION OF A PREFERRED EMBODIMENT

Figure 1:
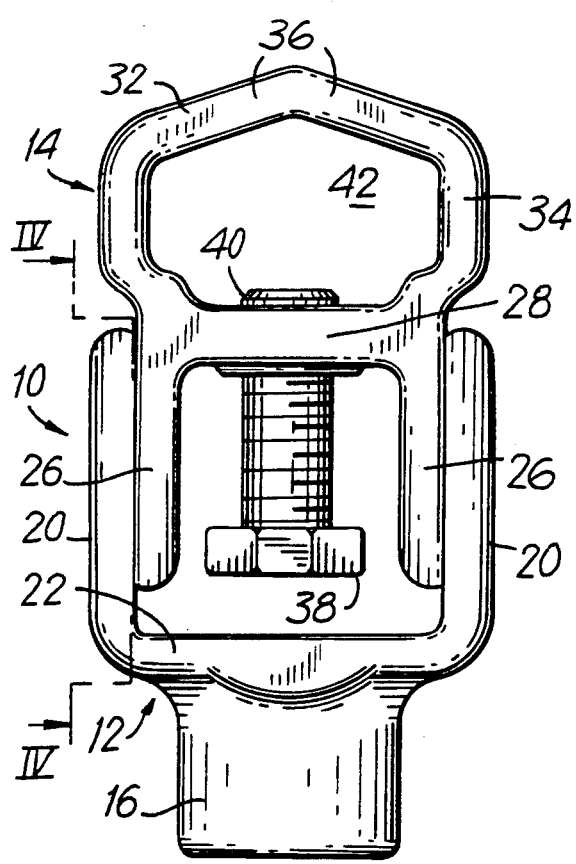
FIG. 1 is a front elevation of a preferred embodiment of the invention.

A preferred embodiment of the present invention is shown in FIGS. 1–5. It should be understood that the invention can be applied to provide holders for a variety of different tools, such as scrapers, strippers or applicators, apart from the embodiment shown. Here, the invention is embodied in a paint brush holder 10, best seen in FIGS. 1 and 2.

The holder is generally made up of two groups of components: a yoke assembly 12 and a carrier assembly 14. The device can be fabricated from any number of materials having sufficient strength, stiffness and durability, as is well known to those in the art, but it is preferred to employ an engineering plastic material, such as a foam polypropylene, and to form the components by an injection molding process. The plastic material may be colored, as desired, or it may be clear, based on aesthetic considerations.

The yoke assembly functions as a base member, attaching to the extension handle and providing a pivot point for the carrier assembly. Attachment is accomplished by the handle mount 16. Commercially available extension handles normally are threaded for attachment to a roller applicator, so it is preferred to employ an identical arrangement here, with a central bore 18, dimensioned to accept an industry-standard handle, having threads 19 formed within the bore, best seen in FIG. 2.

Yoke arms 20 extend upward from the handle mount, connected by a bottom plate 22 to give the assembly an overall U-shaped appearance. As discussed in more detail below, a link mounting aperture 24 is formed in identical locations on each yoke arm.

The carrier assembly 14 can be visualized as a letter H with the upper portion of the letter closed off. The lower, extending portion of the assembly consists of two link arms 26, joined by screw plate 28. The link arms are dimensioned to fit inside the yoke arms with a loose, sliding contact, and each such arm has a yoke mounting aperture 30 formed in identical locations. The link arms are about the same length as the yoke arms; thus, mating the link arms into the yoke arms to align the yoke mounting apertures 30 with the link mounting apertures 24 leaves the extremities of the link arms just above the bottom plate 22, and the screw plate 28 stands just above the extremities of the yoke arms.

Assembling the carrier assembly to the yoke assembly is accomplished by aligning these respective apertures and inserting axle plugs 29 into each set of apertures. The plugs are chosen to provide a snug yet non-binding fit, so that the plug does not slide out of the unit, but the carrier can rotate easily about the apertures' axis. It is preferred to form the plugs from a plastic material similar to but somewhat softer than that of the material used for the yoke and carrier assemblies, as will be understood by those in the art. After the two assemblies are joined, the carrier assembly rotates about the apertures' axis, which may be referred to as the transverse link rotating axis.

The upper end of the carrier assembly is closed to form a brush holder 32. The holder wall is of course a single, continuous piece of plastic, but it has been found that particular shaping facilitates clamping a brush in position. The screw plate 28 and side walls 34 can be straight, but forming the upper walls 36 so that they meet at a shallow angle provides an improved clamping surface as compared with a straight wall. The clamping force for the brush is provided by clamping screw 38, threaded in retaining aperture 40, which is centrally located on screw plate 28. The holder walls define a holder well 42 into which the paint brush handle extends and is clamped in position. Screw 38 should be relatively large, to exert the retaining force over as large an area of the brush handle as practicable. It should be noted that the unit can be dimensioned based on the size brush to be accommodated, as well as the desirability of adapting the handle mount to a standard size extension handle. Based on these criteria, those in the art can choose appropriate specific dimensions based on the disclosure herein.

Figure 4A:
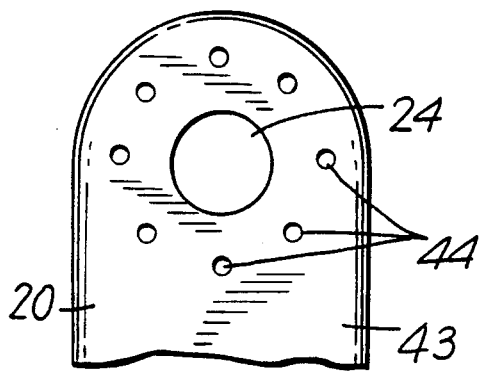
FIGS. 4(a) and (b) are detail side views, from both sides, taken on plane IV—IV of FIG. 1.
Figure 4B:
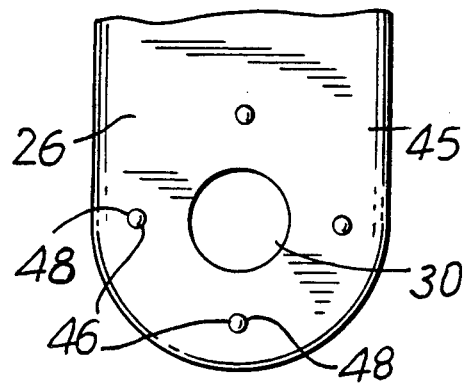

Angular adjustment of the carrier assembly relative to the yoke assembly is provided by a detent system, carried on adjacent surfaces of the yoke and link arms. As best seen in FIG. 4(a), the inner, opposing surface 43 of each yoke arm has eight detent recesses 44 formed therein. The recesses lie equally spaced on a circle concentric with link mounting aperture 24, and the detent radius is chosen so that the recesses lie close to the edge of each yoke arm, consistent with structural requirements of the material. Although the recesses may be formed as a smooth depression in the surface of the yoke arm, it has proved advantageous to form the recesses as apertures extending completely through the yoke arm, as shown.

Figure 5A:
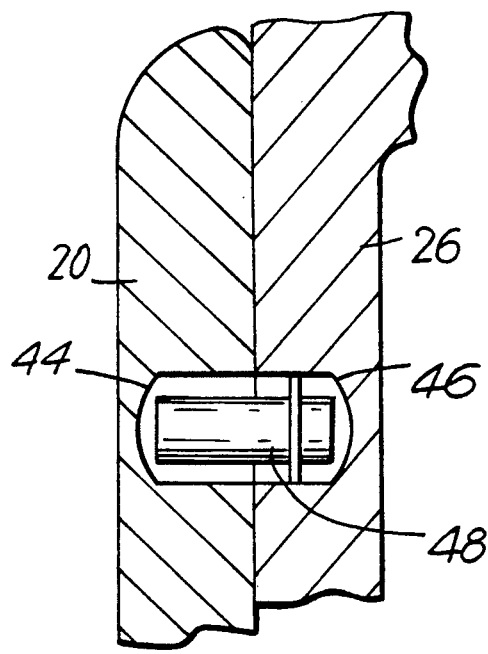
FIG. 5 is a detailed sectional view taken in plane V—V of FIG. 2.
Figure 5B:
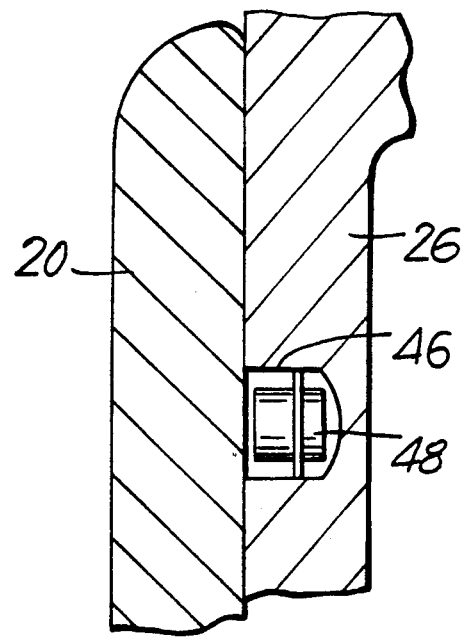
Figure 5:
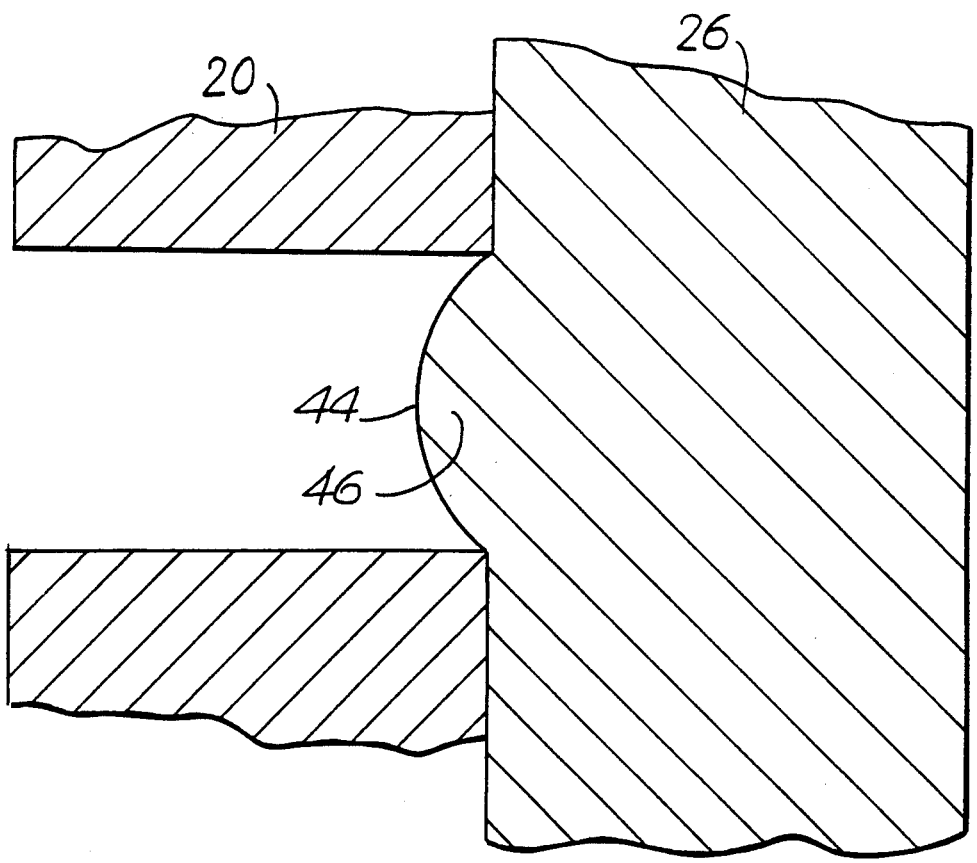

Four link detent projections 46, depicted in FIG. 5, are also formed on the outer surface 45 of each link arm. The projections lie equally spaced on a circle concentric with yoke mounting aperture 30, dimensioned and positioned to be in registration with the array of yoke detent recesses. The projections are preferably formed directly on part of the link arm, dimensioned to be accepted by yoke detent recesses 44.

FIG. 5 illustrates the cooperative functioning of the detent recesses and projections. When a projection 46 is in registration with a yoke detent recess 44, as seen in FIG. 5, the projection is urged into the recess by the link arm, locking the link arm relative to the yoke arm. The imposition of a moment perpendicular to the plane of FIG. 5, such as shown by arrow A of FIG. 3, however, exerts an axial force on the projection. The link arms are sufficiently resilient to bend inward, retracting the projection and allowing the carrier assembly to rotate. When such rotation brings the projection into registration with another detent recess, the projection again extends into same, locking the unit at that position. At each rotational position, all four projections engage detent recesses.

Thus, the carrier assembly rotates in discrete steps, the number and size of those steps determined by the number of yoke detent recesses. Of course, the number of link detent projections could be reduced, but such reduction would decrease the stability of the unit. It has been found that four link detent projections provide a good measure of steadiness, combined with ease of operation of the holder. It is preferred to employ eight yoke detent recesses, providing rotation in 45 degree increments.

An alternative embodiment of the detent means is shown in FIGS. 6(a) and (b). There, four link plunger recesses 146 are formed on the outer surface 45 of each link arm. The recesses lie equally spaced on a circle concentric with yoke mounting aperture 30, dimensioned and positioned to be in registration with the array of yoke detent recesses. Plungers 148 are carried in each link plunger recess. These plungers are spring-loaded and dimensioned to allow their distal ends to protrude beyond the surface of the link arm.

FIGS. 6(a) and 6(b) illustrate the cooperative functioning of the detent recesses and plungers. When a plunger is in registration with a yoke detent recess, as seen in FIG. 6(a), the plunger is urged by its spring into an extended position, projecting into that recess. The imposition of a moment perpendicular to the plane of FIG. 6(a), such as shown by arrow A of FIG. 3, however, exerts an axial force on the distal end of the plunger, causing it to move to a retracted position at or below the level of the yoke surface, allowing the carrier assembly to rotate, as shown in FIG. 6(b). When such rotation brings the plunger into registration with another detent recess, the plunger again extends into same, locking the unit at that position. At each rotational position, all four plungers engage detent recesses.

Figure 2:
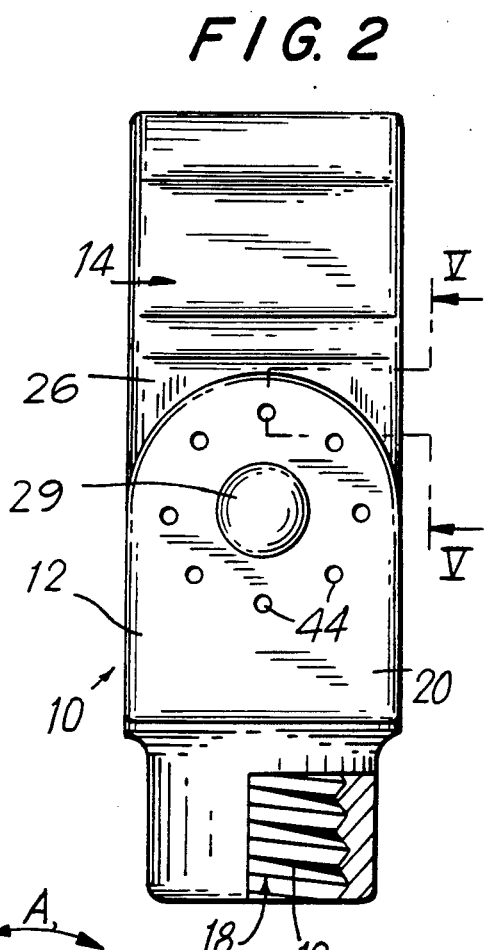
FIG. 2 is a side elevation of the embodiment shown in FIG. 1, partially cut away.
Figure 3:
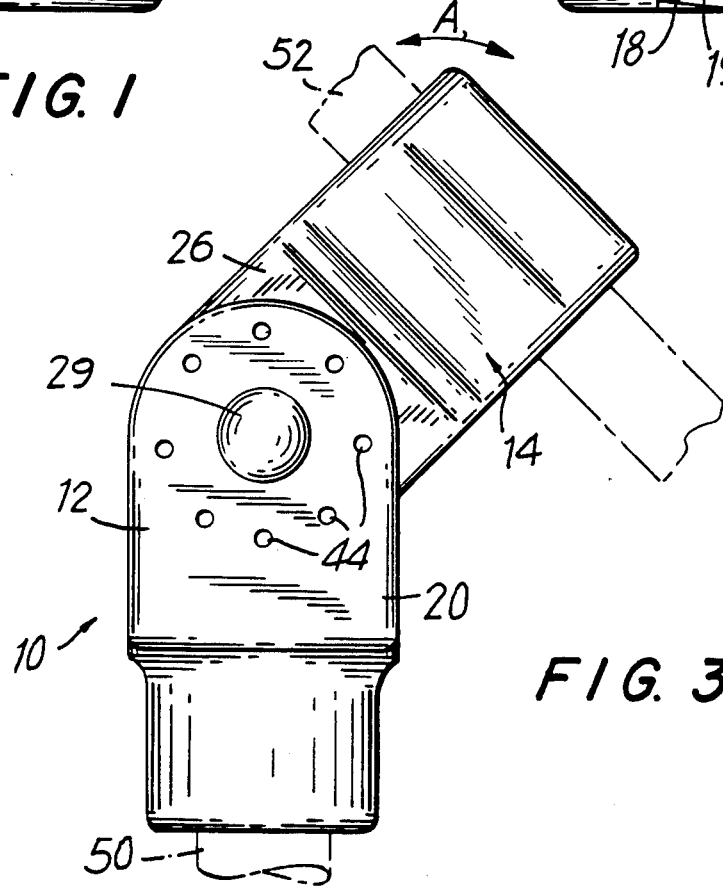
FIG. 3 is a side elevation of the embodiment shown in FIG. 1 in use to hold a tool.

Using the paint brush holder 10 proceeds straightforwardly, as seen in FIGS. 1-3. The user first threads the unit on an extension handle 50 (shown in phantom) in the same manner known in the art for use with a roller applicator. Then the paint brush handle 52 (shown in phantom) is inserted into the holder well 42 and clamped in place with retaining screw 38. The point on the brush handle at which the clamping is applied is largely a matter of user judgement, but it should not be so close to the bristles that the brush cannot be adequately loaded, nor so far that the brush becomes unwieldy. Those in the art will understand that actually using the device will quickly provide the degree of facility required. Finally, the user rotationally adjusts the carrier assembly to the most comfortable position for painting. It is anticipated that a 45 degree rotation, as shown, will be the most widely used. Painting can then proceed.

It will be understood that the embodiments discussed above illustrate but do not limit the scope of the invention. Modifications of the embodiments shown, as well as additional applications, will be clear to those of ordinary skill in the art. For example, the invention can be adapted to hold a variety of hand tools for use in awkward locations. For example, cutting, hammering or spreading implements can be produced. These and other changes may be made without departing from the spirit of the invention, which is defined solely by the claims appended hereto.

I claim:

1. An adjustable tool holder for carrying a tool on a handle, said tool holder comprising:
    yoke means for mounting the holder on the handle;
    carrier means for carrying the tool, said carrier means including link means for mounting said carrier means on said yoke for angular movement in discrete preselected steps about an axis passing through said yoke and operable by imposing a moment force on said link means; and
    clamp means for accepting and retaining a selected portion of the tool therein;
    said yoke means including a handle mount, having a bore threaded to accept the handle therein;
    said yoke means including two parallel spaced yoke arms extending longitudinally from said handle mount, each said yoke arm having a link mounting aperture formed therein and jointly defining a transverse link rotating axis, and wherein inner yoke arm surfaces are mutually opposed, said inner yoke arm surfaces having a plurality of yoke detent recesses formed therein in circular opposed arrays around the periphery of each said link mounting aperture at a selected detent radius distance from said transverse link rotating axis;
    said link means including:
        two parallel link arms, dimensioned to fit within said yoke arms with outer link arm surfaces in sliding contact with respective inner yoke arm surfaces, each said link arm having a yoke mounting aperture formed therein and positioned on said transverse link rotating axis for rotational movement thereon, wherein each link arm includes an outer surface having a plurality of link detent means formed therein, in circular opposed arrays around the periphery of each said yoke mounting aperture at said selected detent radius distance from said transverse link rotating axis, said array on each said link arm capable of being moved into registration and engagement with said array of yoke detent recesses on said adjacent yoke arm;
    whereby, at selected relative rotational positions of said carrier assembly with respect to said yoke assembly, said link detent means engage said yoke detent recesses to retain said carrier assembly at said selected rotational position, and whereby the application of rotational force to said carrier assembly causes said link detent means to disengage from said yoke detent recesses, permitting rotational movement of said carrier assembly;
    said clamp means comprising:
        a holder having a wall defining a hollow holder well dimensioned to accept a selected portion of the tool therein, a portion of said wall transversely extending between and integral with said link arms at a location spaced from said transverse link rotating axis by a distance greater than said selected detent radius distance, said wall portion having a threaded retaining aperture formed therein; and
        a retaining screw threaded in said retaining aperture, the distal end of said screw extending into said holder well, whereby said screw exerts a retaining force on the selected tool portion.

2. The adjustable tool holder of claim 1, wherein each said link detent means is a detent projection formed on said outer link arm surface, dimensioned for acceptance by a said yoke detent recess.

3. The adjustable tool holder of claim 1, wherein each said link detent means includes:
    a link detent recess formed in said outer link arm surface; and
    a detent plunger, carried in said link detent recess and spring mounted for axial movement between a normally extended position wherein a distal end of said plunger extends beyond said link outer surface, and a compressed retracted position wherein said distal end of said plunger does not extend beyond said link outer surface.

4. The adjustable tool holder of claim 1, further comprising two axle plugs, carried in and extending between said link mounting aperture and said yoke mounting aperture.

5. An adjustable tool holder for carrying a tool on a handle, comprising:
    a yoke assembly, including
        a handle mount; and
        two parallel spaced yoke arms, extending longitudinally from said handle mount, each said yoke arm having a link mounting aperture formed therein and jointly defining a transverse link rotating axis, and having mutually opposed inner yoke arm surfaces;

a carrier assembly, including
two parallel link arms, dimensioned to fit within said yoke arms with outer link arm surfaces in sliding contact with respective inner yoke arm surfaces, each said link arm having a yoke mounting aperture formed therein and positioned on said transverse link rotating axis for rotational movement thereon, and having outer link arm surfaces;

a holder, having a wall defining a hollow holder well dimensioned to accept a selected portion of the tool therein; and a retaining means for exerting a retaining force on the selected tool portion;

detent assembly means for permitting rotational movement of said carrier assembly among preselected angular positions with respect to said yoke assembly, including yoke detent recesses formed on said yoke inner yoke arm surfaces and link detent projections formed on said link outer yoke arm surfaces; whereby, at selected relative rotational positions of said carrier assembly with respect to said yoke assembly, said link detent projections engage said yoke detent recesses to retain said carrier assembly at said selected rotational positions, and whereby the application of rotational force to said carrier assembly causes said detent projections to retract from said yoke detent recesses, allowing said carrier assembly to rotate with respect to said yoke assembly; and two axle plugs, carried in and extending between said link mounting apertures and said yoke mounting apertures.

6. The adjustable tool holder of claim 5, wherein said yoke detent recesses are formed as circular opposed arrays around the periphery of each said link mounting aperture at a selected detent radius distance from said transverse link rotating axis.

7. The adjustable tool holder of claim 6, wherein said link detent projections are formed as circular opposed arrays around the periphery of each said yoke mounting aperture at said selected detent radius distance from said transverse link rotating axis.

8. The adjustable tool holder of claim 5, wherein
a portion of said carrier assembly wall transversely extends between and is integral with said link arms at a location spaced from said transverse link rotating axis by a distance greater than said selected detent radius distance, said wall portion having a threaded retaining aperture formed therein; and
said retaining means includes a retaining screw threaded in said retaining aperture, the distal end of said screw extending into said holder well, whereby said screw exerts a retaining force on the selected tool portion.

9. An adjustable tool holder for carrying a tool on a handle, comprising:
a yoke assembly, including
a handle mount, having a bore threaded to accept the handle therein; and
two parallel spaced yoke arms, extending longitudinally from said handle mount, each said yoke arm having a link mounting aperture formed therein and jointly defining a transverse link rotating axis, and wherein inner yoke arm surfaces are mutually opposed, each having a plurality of yoke detent recesses formed therein, in circular opposed arrays around the periphery of each said link mounting aperture at a selected detent radius distance from said transverse link rotating axis;

a carrier assembly, including
two parallel link arms, dimensioned to fit within said yoke arms with outer link arm surfaces in sliding contact with respective inner yoke arm surfaces, each said link arm having a yoke mounting aperture formed therein and positioned on said transverse link rotating axis for rotational movement thereon, wherein each outer link arm surface has a plurality of link detent projections formed therein, in circular opposed arrays around the periphery of each said yoke mounting aperture at said selected detent radius distance from said transverse link rotating axis, said arrays on each said link arm capable of being moved into registration with said array of yoke detent recesses on said adjacent yoke arm;

whereby, at selected relative rotational positions of said carrier assembly with respect to said yoke assembly, said link detent projections engage said yoke detent recesses to retain said carrier assembly at said selected rotational positions, and whereby the application of rotational force to said carrier assembly causes said link detent projections to retract from said yoke detent recesses, permitting rotational movement of said carrier assembly;

a holder, having a wall defining a hollow holder well dimensioned to accept a selected portion of the tool therein, a portion of said wall transversely extending between and integral with said link arms at a location spaced from said transverse link rotating axis by a distance greater than said selected detent radius distance, said wall portion having a threaded retaining aperture formed therein;

a retaining screw threaded in said retaining aperture, the distal end of said screw extending into said holder well, whereby said screw exerts a retaining force on the selected tool portion; and two axle plugs, carried in and extending between said link mounting aperture and said yoke mounting aperture.

* * * * *